(12) United States Patent
Yoshigahara

(10) Patent No.: US 8,497,941 B2
(45) Date of Patent: Jul. 30, 2013

(54) BROADCAST RECEIVING APPARATUS FOR RECEIVING DIGITAL BROADCASTING AND BROADCAST RECEIVING METHOD

(75) Inventor: Noriyuki Yoshigahara, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 148 days.

(21) Appl. No.: 12/965,688

(22) Filed: Dec. 10, 2010

(65) Prior Publication Data

US 2011/0141361 A1    Jun. 16, 2011

(30) Foreign Application Priority Data

Dec. 14, 2009    (JP) ................................. 2009-283451

(51) Int. Cl.
*H04N 9/475* (2006.01)
*H04N 7/00* (2006.01)
*H04N 11/00* (2006.01)

(52) U.S. Cl.
USPC ............ 348/515; 348/569; 348/589; 348/552

(58) Field of Classification Search
USPC .... 348/512, 515, 569, 589, 552–558; 725/37, 725/47, 105, 60, 61; 375/240.28
See application file for complete search history.

(56) References Cited

U.S. PATENT DOCUMENTS

| 6,373,534 | B1 | 4/2002 | Yasuki et al. |
| 6,606,746 | B1 * | 8/2003 | Zdepski et al. ................. 725/37 |
| 6,906,755 | B2 * | 6/2005 | Lundblad et al. ............. 348/515 |
| 7,721,320 | B2 * | 5/2010 | Wennerstrom et al. ....... 725/151 |
| 2009/0135300 | A1 | 5/2009 | Suzuki |

FOREIGN PATENT DOCUMENTS

| JP | 11-27641 A | 1/1999 |
| JP | 2009-130821 A | 6/2009 |

* cited by examiner

*Primary Examiner* — Michael Lee
(74) *Attorney, Agent, or Firm* — Canon USA Inc. IP Division

(57) ABSTRACT

A start of execution of drawing processing of graphics data according to an application is delayed based on a time period required for image processing to be performed on image data according to a broadcast program image.

10 Claims, 8 Drawing Sheets

FIG. 3

| IMAGE QUALITY MODE | NUMBER OF FRAMES TO BE USED | DELAY OFFSET |
|---|---|---|
| DYNAMIC MODE | 10 | +10/60sec |
| CINEMA MODE | 6 | +6/60sec |
| STANDARD MODE | 4 | +4/60sec |
| GAME MODE | 1 | +1/60sec |

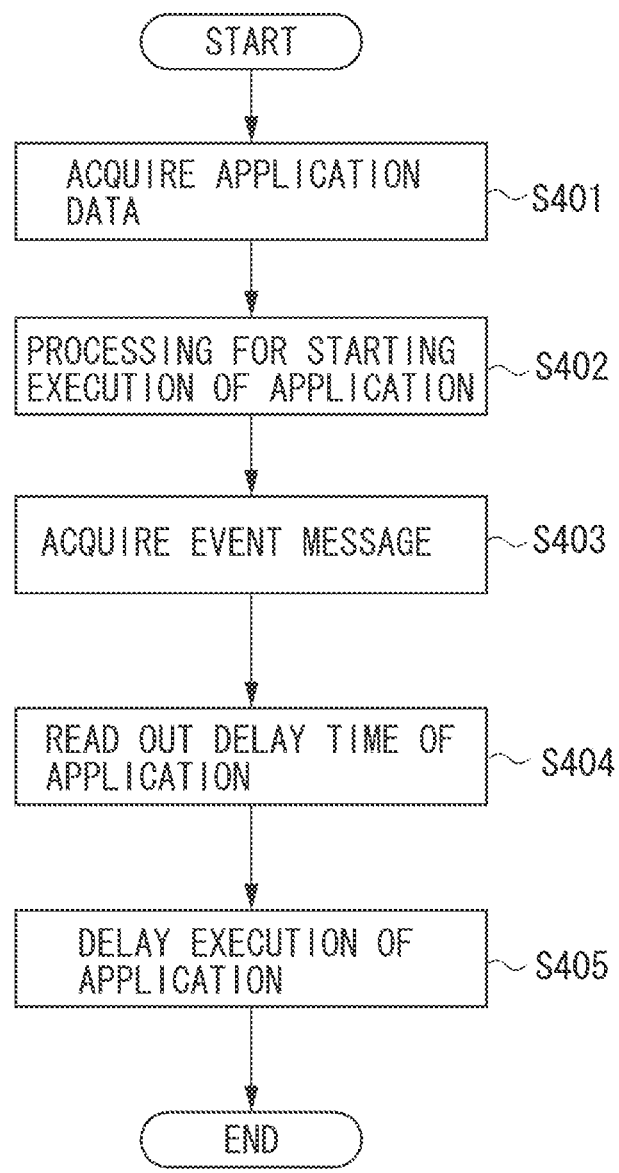

FIG. 5A

| application_type | visibility | Document_resolution | TYPE DETERMINATION RESULT |
|---|---|---|---|
| ARIB-J | INVISIBLE | — | a |
| | VISIBLE | LESS THAN 960 X 540 | b |
| | | EQUAL TO OR MORE THAN 960 X 540 AND LESS THAN 1920 X 1080 | c |
| | | EQUAL TO OR MORE THAN 1920 X 1080 | d |

FIG. 5B

| TYPE | DELAY OFFSET |
|---|---|
| a | 0/60sec |
| b | −1/60sec |
| c | −2/60sec |
| d | −3/60sec |

BROADCAST RECEIVING APPARATUS FOR RECEIVING DIGITAL BROADCASTING AND BROADCAST RECEIVING METHOD

BACKGROUND OF THE INVENTION

1. Field of the Invention

The present invention relates to a broadcast receiving apparatus that receives digital broadcasting and displays an image according to a broadcast program and an image according to an application, in synchronization with each other.

2. Description of the Related Art

In digital terrestrial broadcasting, a broadcast program can be distributed together with an application in liaison with the broadcast program. The image according to the broadcast program is displayed in synchronization with execution of the application in a manner described below. A transport stream (TS) that can be obtained by demodulating a broadcast signal, includes a normal play time (NPT) as the data indicating a passage of time from a start of a program. The application is programmed such that each processing is executed in synchronization with the program in periodic reference to the NPT.

Japanese Patent Application Laid-open No. 11-27641 discusses, according to event activation information supplied from a broadcast station via a broadcast stream, a television (TV) receiver that causes an application object to be activated. As a result, a synchronized control can be performed between a broadcast stream and an application per not an application unit but per an object unit.

Further, Japanese Patent Application Laid-open No. 2009-130821 discusses a technique for realizing an audio playback in synchronization with an image display by delaying a sound according to a delay time of the image display.

In the conventional synchronization control method, since a time period required for image processing performed by the broadcast receiving apparatus differs depending on a image quality mode for displaying the image, sufficiently accurate synchronization could not always be achieved between the image according to the broadcast program and the image according to the application.

SUMMARY OF THE INVENTION

According to an aspect of the present invention, a broadcast receiving apparatus that receives a digital broadcasting and causes a display unit to display an image according to a broadcast program of the digital broadcasting and an image according to an application that is distributed by the digital broadcasting and that is related to the broad cast program, includes an image processing unit configured to perform predetermined image processing on image data according to the broadcast program, a graphics processing unit configured to generate graphics data according to the application and execute drawing processing of thus generated graphics data, and a control unit configured to control the image processing unit in liaison with the graphics processing unit, wherein the control unit delays a start of execution of the drawing processing by the graphics processing unit based on a time period required for the predetermined image processing performed by the image processing unit.

According to the present invention, a synchronization control, which reflects a processing time of an image performed by the broadcast receiving apparatus, realizes an improvement of the synchronization accuracy between the image according to the broadcast program and the image according to the application.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 3 is a table illustrating a correspondency between a image quality mode and a delay time according to the exemplary embodiment of the present invention.

FIG. 4 is a flow chart illustrating synchronization processing according to the exemplary embodiment of the present invention.

FIG. 5A is a table illustrating a type of an application.

FIG. 5B is a table illustrating a correspondency between the types of applications and the delay offsets according to the exemplary embodiment of the present invention.

DESCRIPTION OF THE EMBODIMENTS

Various exemplary embodiments, features, and aspects of the invention will be described in detail below with reference to the drawings.

Figure 1:
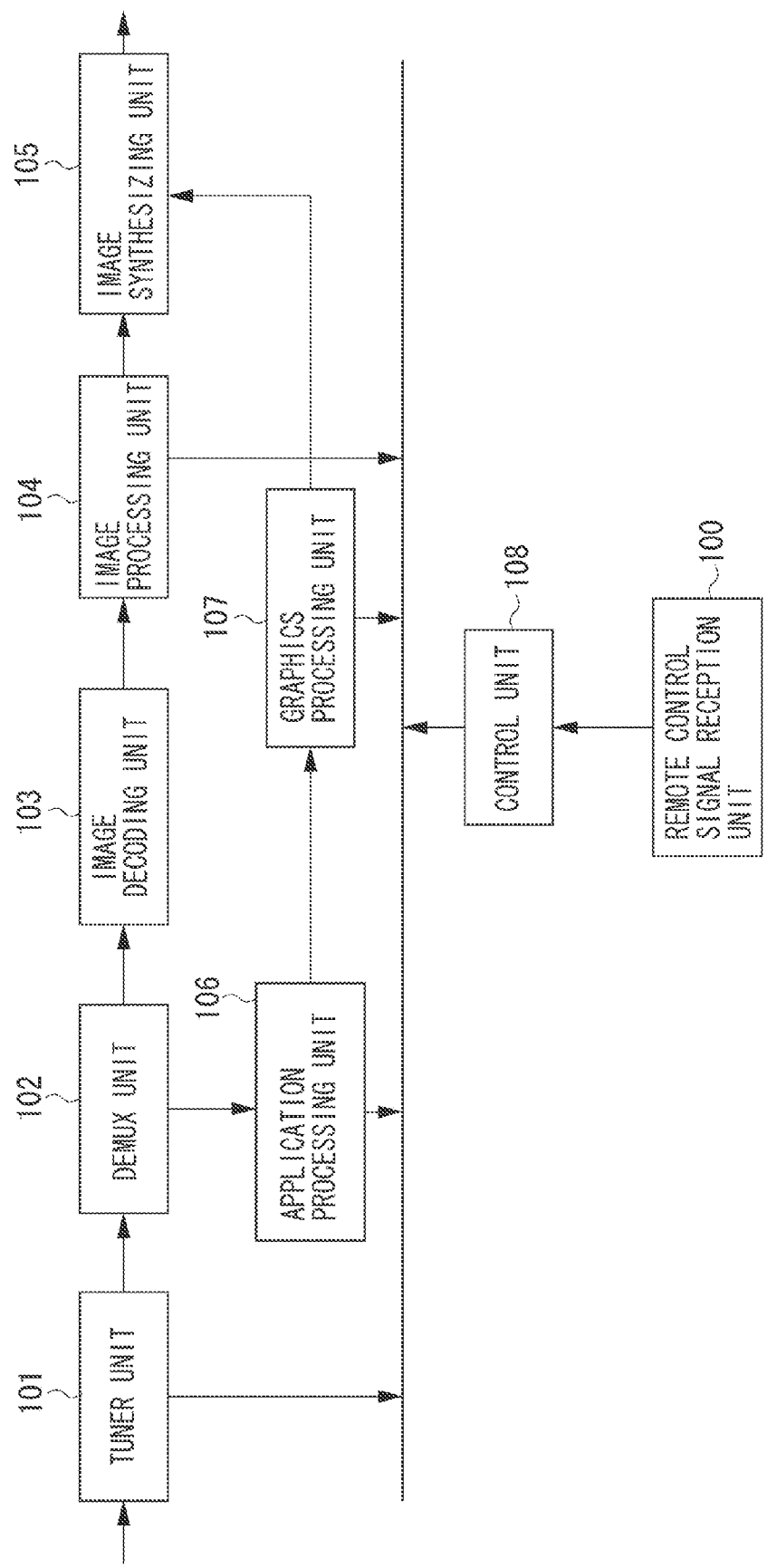
FIG. 1 is a block diagram according to an exemplary embodiment of the present invention.

A first exemplary embodiment is described below. FIG. 1 is a block diagram of a television broadcast-receiving apparatus to which the present invention is applied. A broadcast station distributes a broadcast program and an application that is related to the broadcast program via a digital terrestrial broadcasting. A remote control signal reception unit 100 receives a remote control signal output from a remote control by a user's button operation and outputs a command signal corresponding to the remote control signal to a control unit 108. The control unit 108 outputs a control signal for controlling processing blocks in liaison with each other based on the command signal. A tuner unit 101 receives and demodulates a digital terrestrial broadcasting signal based on the control signal from the control unit 108 and outputs a transport stream (TS). A demux unit (demultiplexing unit) 102 divides multiplexed data in the form of the TS into each of video image data, sound data, and information data. An image decoding unit 103 decodes the video image data according to the program image of the broadcast program.

An image processing unit 104 performs a predetermined signal processing, i.e., resolution conversion processing, internet protocol (IP) conversion processing, and noise reduction processing, on the video image data having been decoded. An image synthesizing unit 105 synthesizes video image data having been subjected to the predetermined signal processing with graphic data to output thus synthesized data in the form of synthesized video image data to a display device. An application processing unit 106 acquires from the demux unit 102 application data within information data and executes thus acquired application based on the control signal from the control unit 108. The application processing unit 106 determines a delay time for executing processing of the application according to a type of a image quality mode relating to the program image to be displayed and performs a synchronization control between the application image and the program image by using the delay time. A graphics processing unit 107 generates graphics data according to the application image and executes drawing processing, in response to the drawing command of the executed application, in order to output the generated graphics data to the image synthesizing unit 105.

The image processing unit 104 selects and executes the image processing according to the image quality mode designated by the control unit 108 among a plurality of image quality modes for displaying the program image. Since the number of image frames to be referred to in this image processing differs according to the image quality modes (see, FIG. 3), video image data having a different delay amount according to each of the image quality modes is output to the image synthesizing unit 105.

Figure 2:
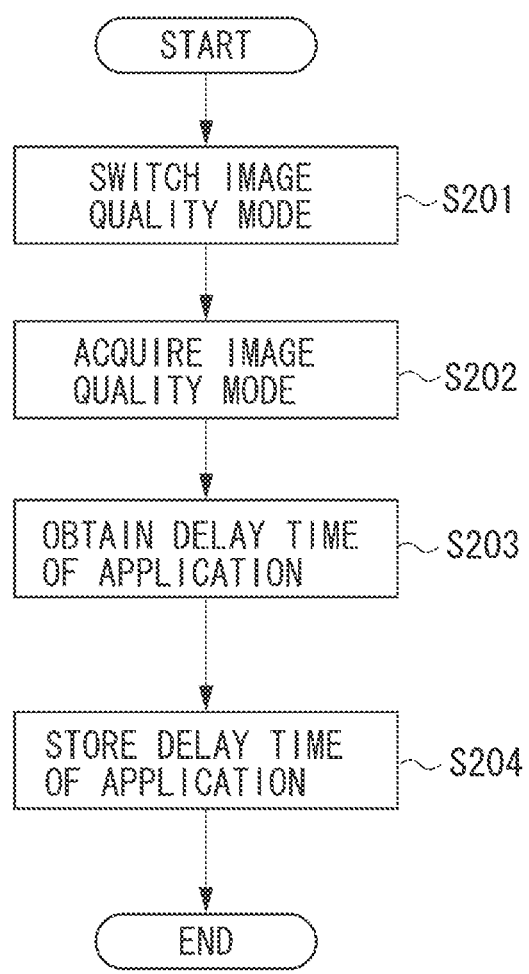
FIG. 2 is a flow chart illustrating a delay time determination processing according to the exemplary embodiment of the present invention.

FIG. 2 is a flow chart illustrating processing for determining a delay time of executing the processing of the application that is performed by the application processing unit 106. The processing is started according to an instruction to execute the application by the user. In step S201, the application processing unit 106 receives a notification from the control unit 108 that the image quality mode was switched according to a user operation or an automatic mode selection operation. In step S202, the application processing unit 106 acquires a new image quality mode from the control unit 108. In step S203, the application processing unit 106 reads out a delay offset value in reference to an internal table as illustrated in FIG. 3, and thus read out delay offset value is converted into a value of a system time reference (27 MHz) which is obtained as the application delay time. The application delay time relates to the image processing. In step S204, thus obtained delay time is stored in a storage unit within the application processing unit 106.

FIG. 4 is a flow chart illustrating a flow of the synchronization processing, performed by the application processing unit 106, between the application image and the program image. There are two methods for synchronizing the program image with the application image. In a first method, an event message (i.e., event information) is included in a broadcast signal at a side of the broadcast station and the broadcast signal including the event message is transmitted such that each processing of the application is executed at a desired timing. At a side of a receiving apparatus, each processing described in an application code is immediately started for execution in response to a reception of the event message. In a second method, at a side of a broadcast station, each processing corresponding to each clock time is included in a broadcast signal in the form of an application code and the broadcast signal is transmitted together with the time information NPT from the broad cast station, and then the processing corresponding to the clock time is executed at a side of the receiving apparatus.

First, the first method is used. When the user operates a remote control to instruct an execution of the application, this processing is started. In step S401, the application processing unit 106 acquires application data from the demux unit 102. In step S402, the application processing unit 106 starts executing the application in order to acquire stream information for drawing an application image contained in the application data. In step S403, the application processing unit 106 acquires an event message contained in the TS from the demux unit 102. In step S404, the application processing unit 106 reads out the delay time of the application upon acquisition of the event message. In step S405, the application causes the graphics processing unit 107 to delay the start of execution of processing that instructs the execution of the drawing processing (i.e., transmission of the drawing command) by the delay time.

Figure 7:
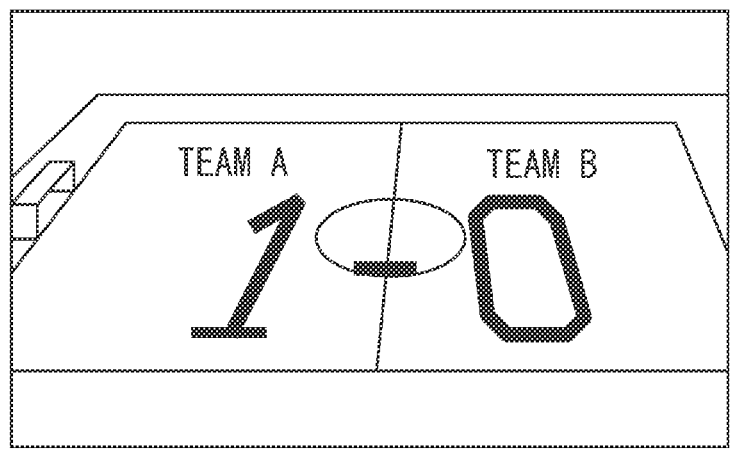
FIG. 7 is a schematic view illustrating a display example of a program image and an application image according to the exemplary embodiment of the present invention.

FIG. 7 is a schematic view illustrating an example of displaying the application image in a case where the present invention is applied to a soccer relay program. Scores of both of the teams are displayed at areas corresponding to sides of the both teams in synchronization with the relayed image.

Further, in a case where the program image is synchronized with the application image according to the above described second method, the following operation is performed. The control unit 108 acquires the time information NPT related to the broadcast program via the digital terrestrial broadcasting. The application makes a query as to the acquisition of the time information to the control unit 108 at a predetermined timing. The control unit 108 responds to this time reference processing of the application and returns time information to the application after causing a delay in the time information NPT acquired from the broadcast signal by a delay time. As a result thereof, processing for instructing an execution of the drawing processing of the application is started with a delay by the delay time.

In the second exemplary embodiment, a rate of drawing processing is determined according to a type of the application, which further improves the synchronization accuracy between the program image and the application image.

According to a standard in Japan, the application is classified to 4 types, i.e., types of a through d, according to a drawing resolution as it is illustrated in FIG. 5A. The type of the application is described in an application information table (AIT) stored in the TS in the form of session form data. Further, FIG. 5B illustrates an internal table in which types of applications and delay offsets correspond to each other. More specifically, the delay offset is related to generation processing of graphics data performed by the graphics processing unit 107. The delay time is set based on a difference between a delay offset of every image quality mode illustrated in FIG. 3 and a delay offset of every type of the application illustrated in FIG. 5B. In a case where the image quality mode delay offset is smaller than the application delay offset (for example, in a case where a game mode and a type c are selected), the delay time is set to zero.

Alternatively, a delay circuit may be provided in the image processing unit 104 and a time may be delayed by the delay time set based on a difference between the delay offset of every image quality mode and the delay offset of every type of the application, thereby outputting the video image data from the image processing unit 104 to the image synthesizing unit 105.

Figure 6:
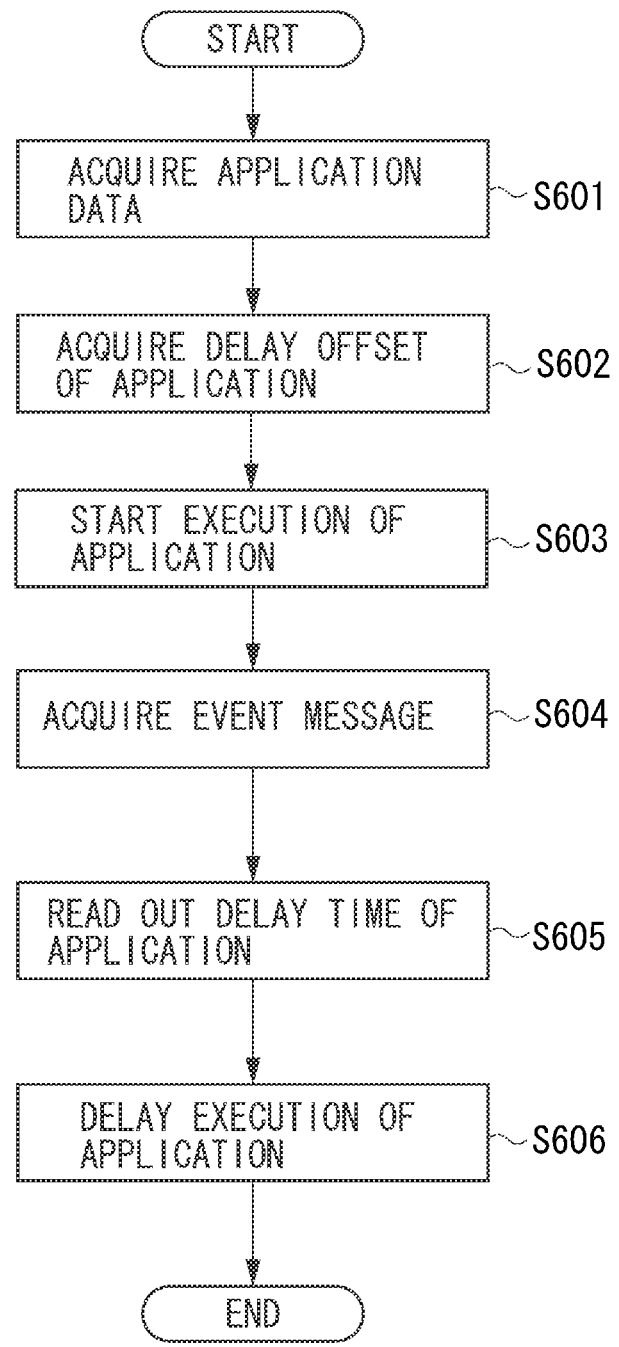
FIG. 6 is a flow chart illustrating the other synchronization processing of the present invention.

FIG. 6 is a flow chart illustrating a flow of synchronization processing, performed by the application processing unit 106, between the application image and the program image. In step S601, the application processing unit 106 acquires application data from the demux unit 102. In step S602, the application processing unit 106 acquires a delay offset of the application with reference to the AIT and the internal table. In step S603, the application processing unit 106 starts execution of the application and acquires stream information for drawing the application image contained in the application data. In step S604, the application processing unit 106 acquires an event message contained in the TS from the demux unit 102. In step S605, the application processing unit 106 reads out a delay time of the application according to the acquisition of the event message. In step S606, the application delays execution start of a transmission of a drawing command to the graphics processing unit 107 by the delay time.

In a third exemplary embodiment, a delay circuit (not shown) is provided within the graphics processing unit 107. The control unit 108 acquires a image quality mode set in the image processing unit 104 and an application type set in the application processing unit 106. The control unit 108 sets a delay time based on a difference between an image quality mode delay offset and an application delay offset. The control unit 108 controls the application processing unit 106 and the graphics processing unit 107 such that the application processing unit 106 transmits stream information to the graphics processing unit 107 in response to reception of an event message. The graphics processing unit 107 generates graphics data based on the stream information. The control unit 108 controls the delay circuit such that the graphics data is output to the image synthesizing unit 105 from the graphics processing unit 107 according to a delay of the graphics data by the delay time. In other words, the graphics data can be synthesized with the video image data output from the image processing unit 104 by the delay of a start of outputting the graphics data to the image synthesizing unit 105 from the graphics processing unit 107.

OTHER EMBODIMENTS

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-283451 filed Dec. 14, 2009, which is hereby incorporated by reference herein in its entirety.

What is claimed is:

1. A broadcast receiving apparatus comprising:
   a receiving unit configured to receive a digital broadcasting signal;
   an output unit configured to output an image of a broadcast program transmitted via the digital broadcasting signal and graphics according to an application that is distributed via the digital broadcasting signal and that is related to the broadcast program;
   an image processing unit configured to perform predetermined image processing on the broadcast program;
   a graphics processing unit configured to execute predetermined drawing processing of the graphics according to the application; and
   a control unit configured to control to synchronize the image of the broadcast program and the graphics according to the application,
   wherein the control unit delays a start of execution of the predetermined drawing processing by the graphics processing unit by determining a time period required for the predetermined drawing processing based on a type of the application.

2. The broadcast receiving apparatus according to claim 1, wherein the control unit delays a start of execution of the predetermined drawing processing by the graphics processing unit based on a difference between the time period required for the predetermined drawing processing executed by the graphics processing unit and a time period required for the predetermined image processing performed by the image processing unit.

3. The broadcast receiving apparatus according to claim 1, wherein the control unit delays a start of execution of the predetermined drawing processing of the application in response to the reception of event information relating to the application that is distributed via the digital broadcasting.

4. The broadcast receiving apparatus according to claim 1, wherein the control unit acquires time information indicating a start time of execution of the application via the digital broadcasting and returns time information that is delayed, to the application in response to time reference processing from the application, thereby delaying the start of execution of the processing of the application.

5. The broadcast receiving apparatus according to claim 2, wherein the time period required for the predetermined image processing performed by the image processing unit is preliminarily determined according to a selected mode of an image quality and the time period required for predetermined drawing processing executed by the graphics processing unit is preliminarily determined according to a type of the application that is classified by resolution of graphics according to the application.

6. A broadcast receiving method comprising:
   receiving a digital broadcasting signal;
   outputting an image of a broadcast program transmitted via the digital broadcasting signal and graphics according to an application that is distributed via the digital broadcasting signal and that is related to a broadcast program;
   performing predetermined image processing on the broadcast program;
   executing predetermined drawing processing of the graphics according to the application;
   synchronizing the image of the broadcast program and the graphics according to the application;
   delaying a start of execution of the predetermined drawing processing la determining a time period required for the predetermined drawing processing based on a type of the application.

7. The broadcast receiving method according to claim 6, wherein the delay of the start of execution of the predetermined drawing processing is based on a difference between the time period required for the predetermined drawing processing executed and a time period required for the predetermined image processing performed.

8. The broadcast receiving method according to claim 6, wherein the delay of the start of execution of the predetermined drawing processing of the application is in response to the reception of event information relating to the application that is distributed via the digital broadcasting.

9. The broadcast receiving method according to claim 6, wherein the time information is acquired indicating a start time of execution of the application via the digital broadcasting and returns time information that is delayed, to the application in response to time reference processing from the application, thereby delaying the start of execution of the processing of the application.

10. The broadcast receiving method according to claim 7, wherein the time period required for the predetermined image processing performed is preliminarily determined according to a selected mode of an image quality and the time period required for predetermined drawing processing executed is preliminarily determined according to a type of the application that is classified by resolution of graphics according to the application.

\* \* \* \* \*